United States Patent
Downie

(10) Patent No.: US 9,448,094 B2
(45) Date of Patent: Sep. 20, 2016

(54) METHOD OF AND APPARATUS FOR MEASURING THE MASS FLOW RATE OF A GAS

(75) Inventor: Neil Alexander Downie, Odiham (GB)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 208 days.

(21) Appl. No.: 13/989,246

(22) PCT Filed: Nov. 28, 2011

(86) PCT No.: PCT/EP2011/071213
§ 371 (c)(1),
(2), (4) Date: Sep. 11, 2013

(87) PCT Pub. No.: WO2012/072597
PCT Pub. Date: Jun. 7, 2012

(65) Prior Publication Data
US 2013/0340859 A1  Dec. 26, 2013

(30) Foreign Application Priority Data
Nov. 29, 2010  (EP) .................................... 10192976

(51) Int. Cl.
| | | |
|---|---|---|
| F16K 17/34 | (2006.01) |
| G01F 1/86 | (2006.01) |
| G01F 1/76 | (2006.01) |
| G01F 1/78 | (2006.01) |
| G01F 15/04 | (2006.01) |
| G01F 15/06 | (2006.01) |
| G01F 15/12 | (2006.01) |

(52) U.S. Cl.
CPC . *G01F 1/86* (2013.01); *G01F 1/76* (2013.01); *G01F 1/78* (2013.01); *G01F 15/043* (2013.01); *G01F 15/063* (2013.01); *G01F 15/125* (2013.01); *Y10T 137/7759* (2015.04)

(58) Field of Classification Search
CPC .............. G01F 1/76; G01F 1/78; G01F 1/86; G01F 1/88; G01F 15/043; G01F 15/125; G01F 15/063; Y10T 137/7759; Y10T 137/8326; Y10T 137/0324; Y10T 137/0396
See application file for complete search history.

(56) References Cited

U.S. PATENT DOCUMENTS 3,491,594 A * 1/1970 Knauth ..................... G01F 1/20
73/861.79
3,561,832 A   2/1971 Karrer et al.
(Continued)

FOREIGN PATENT DOCUMENTS

| CN | 1240024 | 12/1999 |
| CN | 1287616 A | 3/2001 |

(Continued)

OTHER PUBLICATIONS

European Patent Office, International Search Report for PCT Application No. PCT/EP2011/071213, mailed on Aug. 3, 2012.
(Continued)

*Primary Examiner* — Jessica Cahill
(74) *Attorney, Agent, or Firm* — Larry S. Zelson

(57) ABSTRACT

There is provided a meter (200; 350) for measuring the mass flow rate of a gas. The meter comprises a conduit (206) through which the gas flows in use. The conduit has a flow restriction orifice (212) through which choked flow occurs in use. The flow restriction orifice divides the conduit into an upstream portion (214) upstream of said orifice and a downstream portion (216) downstream of said orifice. The meter further comprises a sensor assembly (204), the sensor assembly including a piezoelectric crystal oscillator (218) in said upstream portion such that said piezoelectric oscillator is in contact with said gas when the meter in use. The sensor assembly is arranged: to drive the piezoelectric crystal oscillator such that the piezoelectric crystal oscillator resonates at a resonant frequency; to measure said resonant frequency of said piezoelectric crystal oscillator; and to determine, from the resonant frequency, the mass flow rate through the orifice.

16 Claims, 10 Drawing Sheets

(56) References Cited

U.S. PATENT DOCUMENTS

| | | | |
|---|---|---|---|
| 3,612,966 A | 10/1971 | Dybel | |
| 3,697,766 A * | 10/1972 | Ganter | G04C 3/102 |
| | | | 310/312 |
| 3,902,355 A | 9/1975 | Weisser | |
| 4,126,049 A | 11/1978 | Cotter | |
| 4,232,544 A | 11/1980 | Stansfeld | |
| 4,275,393 A | 6/1981 | Johnston | |
| 4,349,881 A * | 9/1982 | November | G01D 5/248 |
| | | | 374/117 |
| 4,411,161 A * | 10/1983 | November | G01F 1/90 |
| | | | 73/32 A |
| 4,507,970 A | 4/1985 | Dinger | |
| 4,526,480 A | 7/1985 | Ward | |
| 4,644,796 A | 2/1987 | Ward | |
| 4,644,803 A * | 2/1987 | Ward | G01N 9/002 |
| | | | 177/208 |
| 4,644,804 A | 2/1987 | Ramm et al. | |
| 4,680,970 A | 7/1987 | Ueda et al. | |
| 4,713,774 A | 12/1987 | Funk et al. | |
| 4,724,707 A | 2/1988 | Innerhofer | |
| 4,734,609 A | 3/1988 | Jasmine | |
| 4,741,213 A | 5/1988 | Hojoh | |
| 4,747,311 A | 5/1988 | Hojoh | |
| 4,938,068 A | 7/1990 | Clements | |
| 4,995,263 A | 2/1991 | Stocker | |
| 5,136,885 A | 8/1992 | Liebermann et al. | |
| 5,220,836 A | 6/1993 | Harms et al. | |
| 5,231,880 A * | 8/1993 | Ward | G01L 9/0022 |
| | | | 310/338 |
| 5,235,844 A | 8/1993 | Bonne et al. | |
| 5,253,669 A * | 10/1993 | Gray | G05D 16/2053 |
| | | | 137/14 |
| 5,307,668 A | 5/1994 | Vander Heyden | |
| 5,307,683 A | 5/1994 | Phelps et al. | |
| 5,421,190 A | 6/1995 | Brandle et al. | |
| 5,471,882 A | 12/1995 | Wiggins | |
| 5,659,129 A | 8/1997 | Asoyan et al. | |
| 5,900,534 A | 5/1999 | Miller et al. | |
| 5,954,089 A | 9/1999 | Seymour | |
| 6,003,543 A | 12/1999 | Sulatisky et al. | |
| 6,230,731 B1 | 5/2001 | Miller et al. | |
| 6,266,996 B1 | 7/2001 | Livingston | |
| 6,286,361 B1 | 9/2001 | Jones et al. | |
| 6,532,822 B1 | 3/2003 | Boyd | |
| 7,302,830 B2 * | 12/2007 | Kolosov | G01N 9/32 |
| | | | 73/53.01 |
| 7,350,367 B2 * | 4/2008 | Matsiev | G01N 9/002 |
| | | | 62/129 |
| 7,444,878 B1 | 11/2008 | Pepples | |
| 7,454,952 B2 | 11/2008 | Kita et al. | |
| 2002/0174898 A1 * | 11/2002 | Lowery | G02D 7/0635 |
| | | | 137/487.5 |
| 2003/0053516 A1 | 3/2003 | Atherton | |
| 2007/0186982 A1 | 8/2007 | Cohen et al. | |
| 2008/0184804 A1 | 8/2008 | Leverrier et al. | |
| 2009/0151461 A1 | 6/2009 | Ishii | |
| 2010/0107735 A1 | 5/2010 | Pavlovsky | |
| 2010/0132471 A1 | 6/2010 | Hedtke et al. | |
| 2010/0269365 A1 | 10/2010 | Miller et al. | |
| 2011/0074515 A1 * | 3/2011 | Yoshida | H03H 9/0519 |
| | | | 331/155 |
| 2011/0126930 A1 | 6/2011 | Hayashi et al. | |
| 2012/0000559 A1 | 1/2012 | Mussot | |
| 2012/0256086 A1 | 10/2012 | Husebo et al. | |
| 2013/0042698 A1 | 2/2013 | Mayr et al. | |

FOREIGN PATENT DOCUMENTS

| | | |
|---|---|---|
| CN | 1768312 A | 5/2006 |
| CN | 101708437 A | 5/2010 |
| CN | 101761779 A | 6/2010 |
| CN | 101881640 A | 11/2010 |
| CN | 202061563 U | 12/2011 |
| CN | 102472653 A | 5/2012 |
| CN | 202212112 U | 5/2012 |
| DE | 3345750 A1 | 6/1985 |
| DE | 3641842 A1 | 6/1988 |
| DE | 19901119 A1 | 7/2000 |
| DE | 10232823 A1 | 11/2003 |
| DE | 102005050400 A1 | 4/2007 |
| DE | 102010028475 A1 | 11/2011 |
| EP | 0101669 A2 | 2/1984 |
| EP | 0129753 A1 | 2/1985 |
| EP | 0273649 A2 | 7/1988 |
| EP | 0484569 A1 | 5/1992 |
| EP | 0582045 B1 | 5/1993 |
| EP | 0671680 A1 | 9/1995 |
| EP | 1930709 A1 | 11/2008 |
| GB | 1349256 A | 4/1974 |
| JP | 58151517 | 8/1983 |
| JP | 6010148 | 1/1985 |
| JP | 6434547 | 2/1989 |
| JP | 1170824 A | 7/1989 |
| JP | 2027223 A | 1/1990 |
| JP | 3068828 A | 3/1991 |
| JP | 543044 | 2/1993 |
| JP | 09155180 A | 6/1997 |
| JP | 10010031 | 1/1998 |
| JP | 2002122498 A2 | 4/2002 |
| JP | 2004219386 A | 8/2004 |
| JP | 2004286514 A | 10/2004 |
| JP | 2005506495 | 3/2005 |
| JP | 2005241355 | 9/2005 |
| JP | 2006241516 A | 9/2006 |
| JP | 2007244946 A | 9/2007 |
| JP | 2010038867 A | 2/2010 |
| JP | 2015520853 A | 7/2015 |
| JP | 2015526653 A | 9/2015 |
| JP | 2015526694 A | 9/2015 |
| JP | 2015526695 A | 9/2015 |
| JP | 2015526773 A | 9/2015 |
| KR | 20110097278 A | 8/2011 |
| TW | M334632 Y | 6/2008 |
| TW | 201118290 | 6/2011 |
| TW | 201207339 | 2/2012 |
| WO | 9802686 A1 | 1/1998 |
| WO | 9940553 A1 | 8/1999 |
| WO | 2007002288 A2 | 1/2007 |
| WO | 2007050400 A1 | 5/2007 |
| WO | 2011039534 A1 | 4/2011 |
| WO | 2011138147 A1 | 10/2011 |

OTHER PUBLICATIONS

Zeisel, D., H. Menzi and L. Ullrich, "A precise and robust quartz sensor based on tuning fork technology for (SF6)-gas density control", Sensors and Actuators 80, pp. 233-236 (2000).

Trafag AG data sheets "8773 Density Sensor" (4 pp.) from 1999 (brochure date Apr. 1999).

"User handbook GMS gas monitor system", Riset AG, Schaffhausen (Switzerland), version of Jul. 6, 2001.

Boser, Niklaus Mr., Affidavit of May 10, 2009, Riset, concerning the priority of the release of the user handbook of Nov. 6, 2001.

Tietze, U. and Schenk, Ch., "Semiconductor Circuit Technology", pp. 56-59 and pp. 354-357; fourth edition, Springer-Verlag Berlin Heidelberg New York, 1978.

Kuchling H., "Physik, Formein and Gesetze" [Physics, Formulae and Laws], pp. 164-169; 7th edition, Buch-und-Zeit-Verlagsgesellschaft mbH Cologne, 1969.

Decision of the German Federal Patents Court in the matter 20 W (pat) 357/04, handed down on Oct. 12, 2009 and retrievable shortly thereafter on the internet on the home page of the German Federal Patents Court.

Density Sensor 8774 data sheet from Trafag AG, date Jan. 2006.

Suzuki et al., "GD Series Vibratory Gas Density Meters", Yokogawa Technical Report, 2000, No. 29.

(56) References Cited

OTHER PUBLICATIONS

European Patent Office, International Search Report of the International Searching Authority, mailed Jul. 18, 2013, for PCT/EP2013/060686.
European Patent Office, International Search Report of the International Searching Authority, mailed Aug. 2, 2013, for PCT/EP2013/060689.

Suzuki, Jun-ichi, "GD Series Vibratory Gas Density Meters", Yokogawa Technical Report English Edition, No. 29 (2000), pp. 23-26.
Sell, Johannes K., "Real-time monitoring of a high pressure reactor using a gas density sensor", Sensors and Actuators A: 162 (2010) 215-219.
Annex A: Documents cited in Opposition proceedings, included in letter from Beck Greener, Jun. 10, 2015.

* cited by examiner

METHOD OF AND APPARATUS FOR MEASURING THE MASS FLOW RATE OF A GAS

The present invention relates a method of, and apparatus for, measuring the mass flow rate of a gas. More particularly, the present invention relates to a method of, and apparatus for, measuring the mass flow of a gas through a flow restriction orifice using a piezoelectric oscillator.

The methods and apparatus described herein can be applied to systems where fluids of relatively high pressure (e.g. about 10 bar or higher) are present, such as for example, the supply of fluids in high pressure cylinders or manufacturing plants utilising high pressure fluids. The present invention relates particularly to "clean" gases, i.e. gases with little or no impurities or contaminants such as water vapour or dust.

The present invention is particularly applicable to permanent gases. Permanent gases are gases which cannot be liquefied by pressure alone, and for example can be supplied in cylinders at pressures up to 450 bar g (where bar g is a measure of the pressure above atmospheric pressure). Examples are Argon and Nitrogen. However, this is not to be taken as limiting and the term gas may be considered to encompass a wider range of gases, for example, both a permanent gas and a vapour of a liquefied gas.

Vapours of liquefied gases are present above the liquid in a compressed gas cylinder. Gases which liquefy under pressure as they are compressed for filling into a cylinder are not permanent gases and are more accurately described as liquefied gases under pressure or as vapours of liquefied gases. As an example, nitrous oxide is supplied in a cylinder in liquid form, with an equilibrium vapour pressure of 44.4 bar g at 15° C. Such vapours are not permanent or true gases as they are liquefiable by pressure or temperature around ambient conditions.

A compressed gas cylinder is a pressure vessel designed to contain gases at high pressures, i.e. at pressures significantly greater than atmospheric pressure. Compressed gas cylinders are used in a wide range of markets, from the low cost general industrial market, through the medical market, to higher cost applications, such as electronics manufacture utilising high purity corrosive, toxic or pyrophoric specialty gases. Commonly, pressurised gas containers comprise steel, aluminium or composites and are capable of storing compressed, liquefied or dissolved gases with a maximum filling pressure up to 450 bar g for most gases, and up to 900 bar g for gases such as hydrogen and helium.

In order to dispense gases effectively and controllably from a gas cylinder or other pressure vessel, a valve or regulator is required. Often the two are combined to form a Valve with Integrated Pressure Regulator (VIPR). The regulator is able to regulate the flow of the gas such that the gas is dispensed at a constant, or user variable, pressure.

For many applications, it is desirable to know the flow rate of gas from a gas cylinder. This may be critical for many applications; for example, medical applications. A number of different mass flow meter arrangements are known.

A class of mass flow meters that are commonly used in many industrial applications are mechanical mass flow meters. Such meters include mechanical components which move or rotate to measure mass flow. One such type is the inertial flow meter (or coriolis flow meter) which measures fluid flow through the effect of the fluid on shaped tubes. Coriolis meters can handle a wide range of flow rates with high accuracy. However, in order to detect the flow rate, complex systems are required such as actuation, sensing, electronic and computational features.

Alternative mechanical-type mass flow meters are diaphragm meters, rotary meters and turbine meters. However, these types of meters are generally less accurate and involve moving parts which may be subject to wear. Further, meters such as rotary meters are only useful for measuring relatively low flow rates.

An alternative class of mass flow meters are electronic flow meters. Two main types are thermal meters and ultrasonic meters. Thermal flow meters measure the heat transfer through a heated tube to measure flow rate. Ultrasonic flow meters measure the speed of sound in a gaseous medium, sometimes averaging the speed of sound over multiple paths within the pipe. However, both types of electronic flow meter generally require significant signal processing hardware and are generally high-cost items.

According to a first aspect of the present invention, there is provided a method of measuring the mass flow rate of a gas through an orifice through which choked flow occurs, the method using a piezoelectric oscillator in contact with the gas upstream of the orifice and comprising; a) driving the piezoelectric crystal oscillator such that the piezoelectric crystal oscillator resonates at a resonant frequency; b) measuring the resonant frequency of the piezoelectric oscillator; and c) determining, from the resonant frequency, the mass flow rate of gas through said orifice.

By providing such a method, the mass flow rate of a gas through a restrictive orifice can easily be determined using a robust and relatively inexpensive piezoelectric crystal oscillator, for example, a quartz crystal oscillator. The piezoelectric crystal oscillator will oscillate at a resonant frequency which is dependent upon the density of the gas in which the oscillator is immersed. Since, under choked flow conditions, the density of the gas upstream of the orifice is proportional to the mass flow rate through the orifice, a crystal oscillator can be utilised to measure mass flow rate.

Such an oscillator functions both as an excitation source (by oscillating in response to being driven by a drive circuit) and a detector (by having a single resonant frequency which is dependent upon the environment in which the oscillator is located). Additionally, a crystal oscillator is robust and, as a result, is relatively unaffected by environmental disturbances. Further, the components which are required to operate such an oscillator are compact and low cost.

In one embodiment, the pressure upstream of said orifice is at least 0.5 bar higher than the pressure downstream of said orifice.

In one embodiment, the method further comprises determining the temperature of the gas upstream of the orifice.

In one arrangement, the gas is dispensed from a pressure regulator or valve located upstream of the piezoelectric crystal oscillator.

In one arrangement, the pressure regulator is electronically controlled in response to the measured mass flow rate of gas through said orifice.

In one embodiment, said piezoelectric oscillator comprises a quartz crystal oscillator.

In an embodiment, the quartz crystal comprises at least one tine. In a variation, the quartz crystal comprises a pair of planar tines.

In an embodiment, the quartz crystal is AT cut or SC cut.

In a variation, the surface of the quartz crystal is directly exposed to the gas.

In one embodiment, the sensor assembly comprises a drive circuit. In a variation, the sensor assembly comprises a drive circuit comprising a Darlington pair arranged in a feedback configuration from a common emitter amplifier.

In one embodiment, the sensor assembly comprises a power source. In one arrangement, the power source comprises a lithium-ion battery.

In one embodiment, the sensor assembly comprises a processor.

In one arrangement, said piezoelectric crystal oscillator comprises at least two planar tines.

In one embodiment, said piezoelectric crystal oscillator has a resonant frequency of 32 kHz or greater.

According to a second embodiment of the present invention, there is provided a meter for measuring the mass flow rate of a gas, the meter comprising a conduit through which the gas flows in use, the conduit having a flow restriction orifice through which choked flow occurs in use, the flow restriction orifice dividing the conduit into an upstream portion upstream of said orifice and a downstream portion downstream of said orifice, the meter further comprising a sensor assembly, the sensor assembly including a piezoelectric crystal oscillator in said upstream portion such that said piezoelectric oscillator is in contact with said gas when the meter in use, said sensor assembly being arranged: to drive the piezoelectric crystal oscillator such that the piezoelectric crystal oscillator resonates at a resonant frequency; to measure said resonant frequency of said piezoelectric crystal oscillator; and to determine, from the resonant frequency, the mass flow rate through the orifice.

By providing such an arrangement, the mass flow rate of a gas through a restrictive orifice can easily be determined using a robust and relatively inexpensive piezoelectric crystal oscillator, for example, a quartz crystal oscillator. The piezoelectric crystal oscillator will oscillate at a resonant frequency which is dependent upon the density of the gas in which the oscillator is immersed. Since, under choked flow conditions, the density of the gas upstream of the flow restriction orifice is proportional to the mass flow rate through the orifice, a crystal oscillator can be utilised to measure mass flow rate.

Such an oscillator functions both as an excitation source (by oscillating in response to being driven by a drive circuit) and a detector (by having a single resonant frequency which is dependent upon the environment in which the oscillator is located). Additionally, a crystal oscillator is robust and, as a result, is relatively unaffected by environmental disturbances. Further, the components which are required to operate such an oscillator are compact and low cost.

In one arrangement, the meter further comprises one or more of a drive circuit, a processor and a power source.

In one embodiment, said piezoelectric oscillator comprises a quartz crystal oscillator.

In an embodiment, the quartz crystal comprises at least one tine. In a variation, the quartz crystal comprises a pair of planar tines.

In an embodiment, the quartz crystal is AT cut or SC cut.

In a variation, the surface of the quartz crystal is directly exposed to the gas.

In one embodiment, the sensor assembly comprises a drive circuit. In a variation, the sensor assembly comprises a drive circuit comprising a Darlington pair arranged in a feedback configuration from a common emitter amplifier.

In one embodiment, the sensor assembly comprises a power source. In one arrangement, the power source comprises a lithium-ion battery.

In one embodiment, the sensor assembly comprises a processor.

In one arrangement, the drive circuit comprises a Darlington pair arranged in a feedback configuration from a common emitter amplifier.

In one arrangement, the meter further comprises a temperature sensor arranged to determine the temperature of gas adjacent said piezoelectric oscillator.

In one arrangement, the meter is arranged downstream of a pressure regulator or valve.

In a further arrangement, the meter is arranged to control electronically the pressure regulator or valve in response to the measured mass flow rate through the flow restriction orifice.

In one arrangement, said piezoelectric crystal oscillator comprises at least two planar tines.

In one arrangement, said piezoelectric crystal oscillator has a resonant frequency of 32 kHz or greater.

According to a third embodiment of the present invention, there is provided a computer program product executable by a programmable processing apparatus, comprising one or more software portions for performing the steps of the first aspect.

According to a fourth embodiment of the present invention, there is provided a computer usable storage medium having a computer program product according to the fourth aspect stored thereon.

Embodiments of the present invention will now be described in detail with reference to the accompanying drawings, in which.

Figure 1:
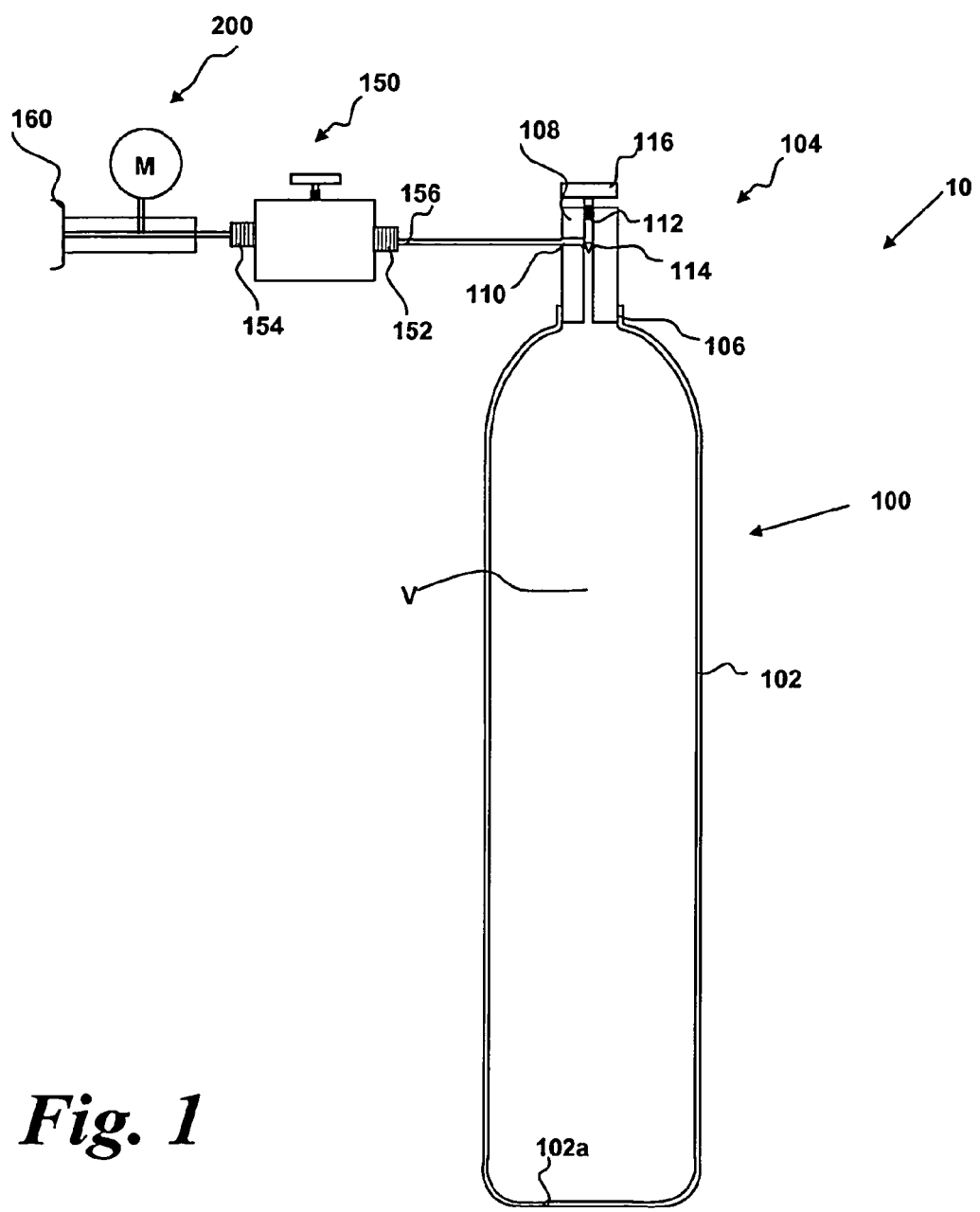
FIG. 1 is a schematic diagram of a gas cylinder and regulator assembly.

FIG. 1 shows a schematic view of a gas cylinder assembly 10 according to an embodiment of the invention. FIG. 1 shows a schematic view of a situation in which the present invention may be used. A gas cylinder 100, regulator 150 and meter assembly 200 are provided.

The gas cylinder 100 has a gas cylinder body 102 and a valve 104. The gas cylinder body 102 comprises a generally cylindrical pressure vessel having a flat base 102*a* arranged to enable the gas cylinder assembly 10 to stand unsupported on a flat surface.

The gas cylinder body 102 is formed from steel, aluminium and/or composites material and is adapted and arranged to withstand internal pressures up to approximately 900 bar g. An aperture 106 is located at a proximal end of the gas cylinder body 102 opposite to the base 102a and comprises a screw thread (not shown) adapted to receive the valve 104.

The gas cylinder 100 defines a pressure vessel having an internal volume V. Any suitable fluid may be contained within the gas cylinder 100. However, the present embodiment relates, but is not exclusively limited to, purified permanent gases which are free from impurities such as dust and/or moisture. Non-exhaustive examples of such gases may be: Oxygen, Nitrogen, Argon, Helium, Hydrogen, Methane, Nitrogen Trifluoride, Carbon Monoxide, Krypton or Neon.

The valve 104 comprises a housing 108, an outlet 110, a valve body 112 and a valve seat 114. The housing 108 comprises a complementary screw thread for engagement with the aperture 106 of the gas cylinder body 102. The outlet 110 is adapted and arranged to enable the gas cylinder 100 to be connected to other components in a gas assembly; for example, hoses, pipes, or further pressure valves or regulators. The valve 104 may, optionally, comprise a VIPR (Valve with Integrated Pressure Reduction). In this situation, the regulator 150 may be omitted.

The valve body 112 can be axially adjusted towards or away from the valve seat 114 by means of rotation of a graspable handle 116 selectively to open or to close the outlet 110. In other words, movement of the valve body 112 towards or away from the valve seat 112 selectively controls the area of the communication passageway between the interior of the gas cylinder body 102 and the outlet 110. This, in turn, controls the flow of gas from the interior of the gas cylinder assembly 100 to the external environment.

A regulator 150 is located downstream of the outlet 110. The regulator 150 has an inlet 152 and an outlet 154. The inlet 152 of the regulator 150 is connected to an inlet pipe 156 which provides a communication path between the outlet 110 of the gas cylinder 100 and the regulator 150. The inlet 152 of the regulator 150 is arranged to receive gas at a high pressure from the outlet 110 of the gas cylinder 100. This may be any suitable pressure; however, generally, the pressure of gas exiting the outlet 110 will be in excess of 20 bar and more likely to be in the region of 100-900 bar.

The outlet 154 is connected to an outlet pipe 158. A coupling 160 is located at the distal end of the outlet pipe 158 and is adapted for connection to further pipes or devices (not shown) for which the gas is required.

A meter assembly 200 is located in communication with the outlet pipe 158 between the outlet 154 and the coupling 160. The meter assembly 200 is located immediately downstream of the regulator 150 and is arranged to determine the mass flow rate of the gas delivered to the outlet 160.

Figure 2:
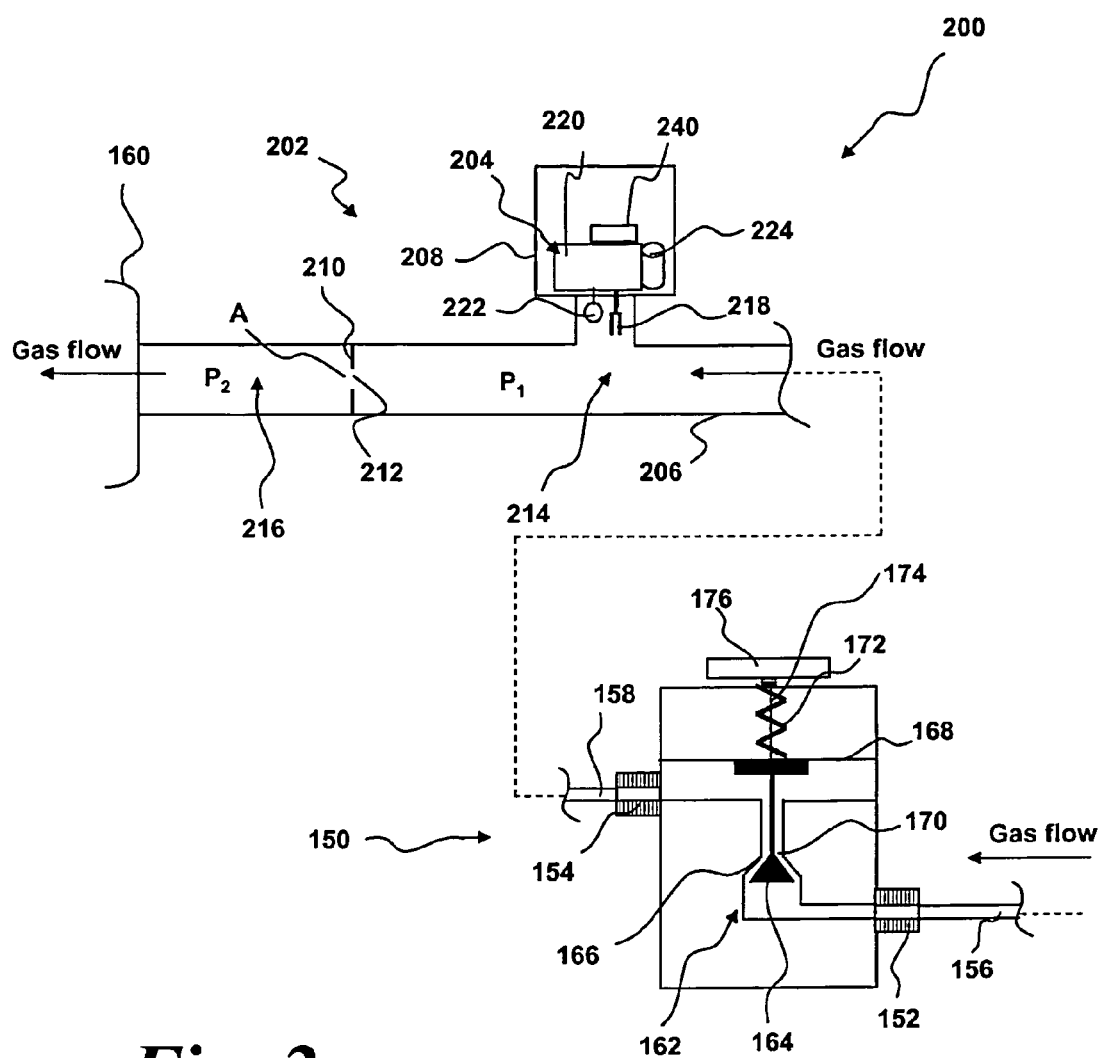
FIG. 2 is a schematic diagram showing a regulator assembly and a meter assembly according to a first embodiment of the invention.

The regulator 150 and meter assembly 200 according to a first embodiment of the present invention are shown in greater detail in FIG. 2.

In this embodiment, the regulator 150 comprises a single diaphragm regulator. However, the skilled person would be readily aware of variations that could be used with the present invention; for example, a two diaphragm regulator or other arrangement.

The regulator 150 comprises a valve region 162 in communication with the inlet 152 and outlet 154. The valve region 162 comprises a poppet valve 164 located adjacent a valve seat 166. The poppet valve 164 is connected to a diaphragm 168 which is configured to enable translational movement of the poppet valve 164 towards and away from the valve seat 166 to close and open respectively an aperture 170 therebetween. The diaphragm 168 is resiliently biased by a spring 172 located about a shaft 174.

The regulator 150 is operable to receive gas from the outlet 110 at full cylinder pressure (e.g. 100 bar), but to deliver gas at a substantially constant fixed low pressure (e.g. 5 bar) to the outlet 154. This is achieved by a feedback mechanism whereby the pressure of gas downstream of the aperture 170 is operable to act on the diaphragm 168 in opposition to the biasing force of the spring 172.

Should the pressure of gas in the region adjacent the diaphragm 168 exceed the specified level, the diaphragm 168 is operable to move upwards (relative to FIG. 2). As a result, the poppet valve 164 is moved closer to the valve seat 166, reducing the size of the aperture 170 and, consequently, restricting flow of gas from the inlet 152 to the outlet 154. In general, the competing forces of the resistance of the spring 172 and the pressure of the gas will result in an equilibrium position of the diaphragm and, consequently, delivery of a constant pressure of gas at the outlet 154.

A graspable handle 176 is provided to enable a user to adjust the biasing force of the spring 172, thereby moving the position of the diaphragm 168 and, as a result, adjusting the equilibrium spacing between the poppet valve 164 and the valve seat 166. This enables adjustment of the dimensions of the aperture 170 through which the high pressure gas flow from the outlet 110 can pass.

The meter assembly 200 comprises a body 202 and a sensor assembly 204. The body 202 may comprise any suitable material; for example, steel, aluminium or composites. The body 202 comprises a conduit 206 and a housing 208. The conduit 206 is in communication with the interior of the outlet pipe 158 and is arranged to connect thereto. The conduit 206 provides a communication pathway between the outlet 154 and the coupling 160 (and, concomitantly, user devices or applications connected to the coupling 160).

An orifice plate 210 is located within the interior of the conduit 206. The orifice plate 210 comprises a wall which delimits a restricted orifice 212. The orifice plate 210 forms a flow restriction within the conduit 206. The orifice 212 has a cross-sectional area A which is small relative to the cross-sectional area of the conduit 406 such that the flow velocity through the orifice 212 is in a choked condition, as will be described later.

Whilst the orifice plate 210 is shown as a thin-walled plate in FIG. 2, this need not be so. The orifice plate 210 may take any suitable form of wall and may have a tapering profile, or may have a greater thickness than shown. Alternatively, any suitable flow restriction may be used in place of the orifice plate 210. For example, the flow restriction may comprise a portion of a tube of narrower diameter than the remainder thereof. The skilled person would be readily aware of alternative flow restrictions which may be used to provide a flow restriction orifice 212 through which, in use, choked flow occurs.

In the present embodiment, the conduit 206 has a length of the order of a few centimeters. The orifice plate 210 delimits an orifice 212 having a diameter in the range of 0.1 mm-4 mm. This is sufficient to provide a choked flow condition and to supply a flow rate of gas through the orifice 212 of between 1 l to 40 liters/minutes for a gases such as Nitrogen or Argon. For a gas having a lower molecular weight, the diameter of the orifice 212 can be scaled down to achieve a similar flow rate. Alternatively, for larger flow rates, the orifice 212 can be scaled up accordingly, provided that the upstream pressure is sufficiently higher than the downstream pressure to create choked flow conditions through the orifice 212.

The orifice plate 210 divides the interior of the conduit 206 into an upstream section 214 upstream of the orifice plate 210, and a downstream section 216 downstream of the orifice plate 210. In use, when gas is flowing from the outlet 154 of the regulator 150 into the upstream part 214 of the conduit 206, the orifice plate 210 will act as a flow restriction, resulting in a pressure differential between the upstream 214 and downstream 216 portions of the conduit 206. Consequently, the upstream portion 214 of the conduit 206 is at a first pressure $P_1$ and the downstream portion 216 of the conduit is at a second (and, in use, lower) pressure $P_2$. This will be described in detail later.

The housing 208 is located adjacent the upstream portion 214 of the conduit 206 and is arranged to contain at least a part of the sensor assembly 204. The interior of the housing 208 may be at atmospheric pressure or may be in communication with the interior of the conduit 206 and, consequently, at the same pressure as the interior of the outlet pipe 158. This would eliminate the requirement for a pressure feed-through between the housing 208 and the interior of the conduit 206.

Alternatively, the housing 208 could be provided as part of the conduit 206. For example, a part of the conduit 206 could be widened to accommodate the sensor assembly 204.

These arrangements are practicable because the inventors have found that only a few components of the sensor assembly 204 are sensitive to high pressure. In particular, larger components such as batteries can be susceptible to high pressures. However, it has been found that lithium ion batteries perform particularly well under the high pressures encountered within the upstream portion 214 of the conduit 206. Consequently, the battery 224 comprises lithium ion cells. However, alternative suitable power sources would be readily be contemplated by the skilled person.

The potential location of the sensor assembly 204 entirely within the conduit 206 provides additional flexibility when configuring the meter assembly 200. In particular, the location of relatively fragile electronic components entirely within the metal or composite walls of the body 202 without the requirement for a protrusion such as the housing 208 provides considerable protection from environmental or accidental damage. This is particularly important, for example, in storage areas or depots, where gas cylinders may be located adjacent other gas cylinders, heavy machinery or rough surfaces.

Additionally, the internal location of the sensor assembly 204 protects these components from environmental conditions such as salt, water and other contaminants. This would allow, for example, a high impedance circuit which is highly sensitive to salt and water damage to be used as part of the sensor assembly 204.

The meter assembly 200 is arranged to measure the mass flow rate of the gas passing through the orifice 212. This gas is measured by the sensor assembly 204. The sensor assembly 204 comprises a quartz crystal oscillator 218 connected to a drive circuit 220, a temperature sensor 222 and a battery 224.

In this embodiment, the quartz crystal oscillator 218 and temperature sensor 222 are located in communication with the interior of the upstream portion 214 of the conduit 206, whist the remaining components of the sensor assembly 204 are located within the housing 208. In other words, the quartz crystal oscillator 218 is immersed in the gas upstream of the orifice plate 210. A microprocessor 240 may also be provided, either separately or as part of the drive circuit 220.

The drive circuit 220 and quartz crystal oscillator 218 will be described in detail later with reference to FIGS. 4 and 5.

The temperature sensor 222 comprises a thermistor. Any suitable thermistor may be used. High accuracy is not required from the thermistor. For example, an accuracy of 0.5° C. is suitable for this embodiment. Consequently, cheap and small components can be used.

In this arrangement, the quartz crystal oscillator 218 is constantly under isostatic pressure within the conduit 206 and, consequently, does not experience a pressure gradient. In other words, any mechanical stress originating from the pressure difference between external atmosphere and the interior of the body 202 of the meter assembly 200 is expressed across the body 202.

Figure 3:
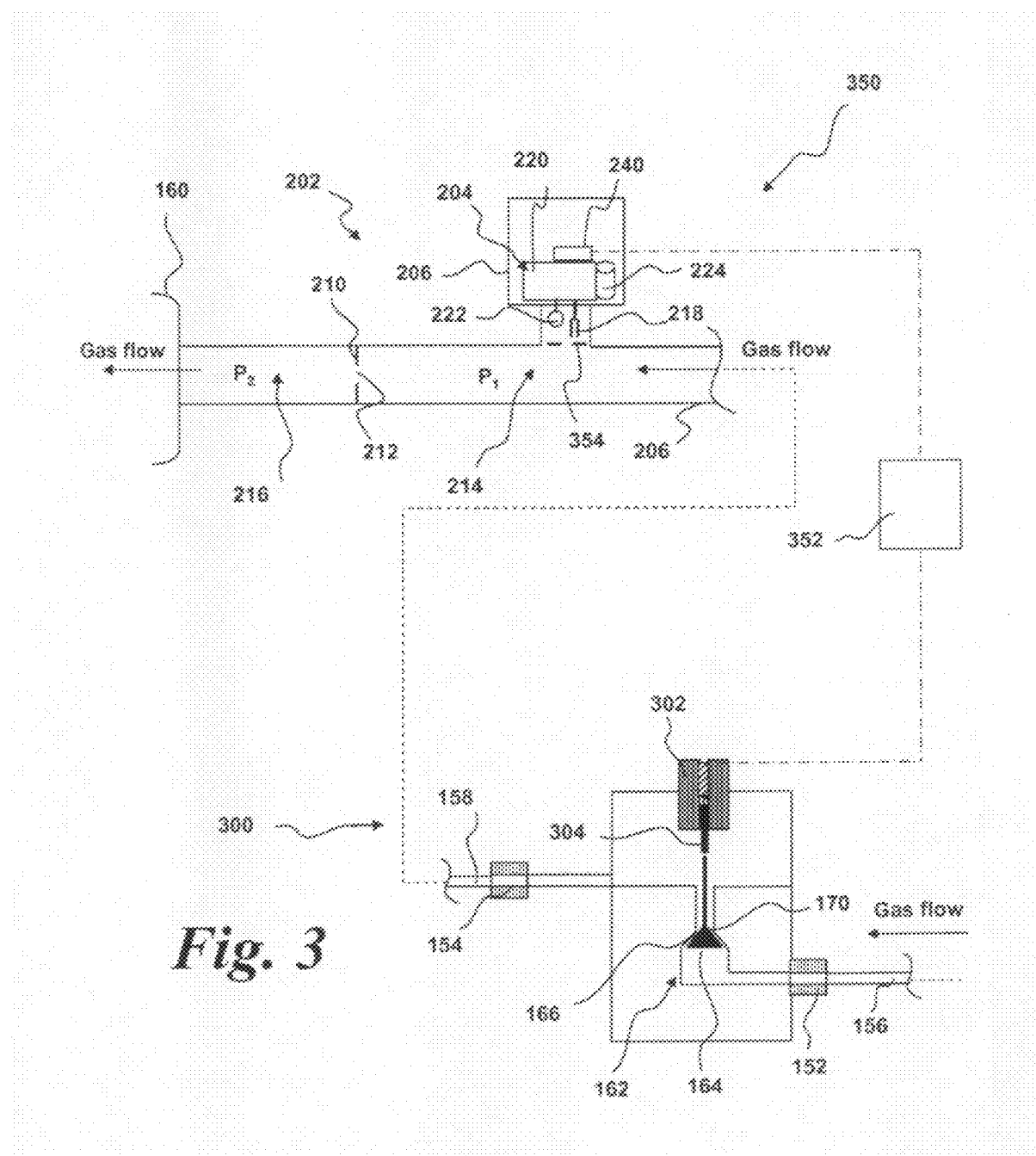
FIG. 3 is a schematic diagram showing a regulator assembly and a meter assembly according to a second embodiment of the invention.

A second embodiment of the invention is shown in FIG. 3. The features of the second embodiment shown in FIG. 3 which are in common with the first embodiment of FIG. 2 are allocated the same reference numerals and will not be described again here.

In the embodiment of FIG. 3, the regulator 300 differs from the regulator 150 of the FIG. 2 embodiment in that the regulator 300 is arranged to provide automatic control of gas from the outlet 154 by means of a solenoid valve 302. The solenoid valve 302 comprises an armature 304 which is movable in response to an electric current through the coils (not shown) of the solenoid valve 302. The armature 304 is movable to directly open or close the poppet valve 164 and, consequently, the aperture 170.

The solenoid valve 302 shown in FIG. 3 is in the normally open condition. In other words, in the absence of an electrical current through the solenoid valve 302, the armature 304 is in an extended position such that the poppet valve 164 is open, i.e. the aperture 170 is open. If a current is applied to the solenoid valve 302, the armature 304 will retract and the poppet valve 164 will close.

The skilled person would be readily aware of alternative variations of solenoid valve which could be used with the present invention. For example the armature 304 may act directly on the diaphragm, or may control flow through a narrow conduit in communication with the outlet 154 in order to regulate movement of the diaphragm 168. Alternatively, the poppet valve could be eliminated and the diaphragm 168 itself could be the valve member controlling directly the flow of gas from the inlet 152 to the outlet 154.

The second embodiment comprises a meter assembly 350. Components of the meter assembly 350 in common with the meter assembly 200 are allocated the same reference numerals for clarity.

The meter assembly 350 is substantially similar to the meter assembly 200 of the first embodiment. However, the meter assembly 350 further comprises an electronic solenoid drive 352 connected to the solenoid valve 302 and to the sensor assembly 204. The solenoid drive 352 is arranged to receive a signal from the sensor assembly 204 and to control the solenoid valve 302 in response to that signal and, consequently, control the flow through the regulator 300.

The solenoid drive 352 may comprise any suitable drive circuit for controlling the solenoid valve 302. One suitable circuit may be an operational amplifier arrangement having an input from the sensor assembly 204 to the negative terminal of the operational amplifier. Consequently, to the positive terminal could be attached a variable resistor designed to provide a constant reference level and act as a comparator.

An input from the sensor assembly 204 to the solenoid drive 352 will cause operation of the solenoid valve 302. For example, if the input signal from the sensor assembly 204 (or, alternatively, the processor 240) exceeds a particular threshold level, the solenoid drive 352 may energise the solenoid valve 302. The solenoid valve 302 may be controlled in a digital (i.e. on or off) manner where a DC voltage is varied between a maximum and a minimum value. Alternatively, the DC voltage from the solenoid drive 352 may be continuously variable to adjust the position of the poppet valve 164 accurately in an analogue manner.

Additionally or alternatively, the solenoid drive 352 may control the solenoid valve 302 by means of a DC output comprising an AC component. Since the extension of the armature 304 from the solenoid valve 302 is approximately proportional to the applied current, this causes the armature 304 of the solenoid valve 302 to oscillate. Such oscillations mitigate "stiction" of the armature 304, i.e. assist in preventing the armature 304 from becoming stuck or jammed.

Alternatively, other control arrangements, such as FETs, microprocessors or ASICs may be used as appropriate to control the operation of the solenoid valve 302. Further, as discussed, the solenoid valve 302 may operate in either a digital (i.e. on/off) or analogue (i.e. continuously variable) modes to enable accurate movement of the poppet valve 164 or similar.

The first or second embodiments may additionally comprise a display (not shown) to show a user the results of measurements made on the detected gas. Alternatively, the display may be located remote from the meter assemblies 200, 350 and the relevant data may be communicated remotely.

In order for the quartz crystal oscillator 218 to provide an accurate measurement, the quartz crystal oscillator 218 must be kept free of dirt, moisture and other contamination. Whilst this is not an issue for commercially-supplied packaged gases (which are extremely clean), the meter assembly 350 may be used in situations where environmental contamination may be a significant issue.

Consequently, the meter assembly 200, 350 is provided with a filter 354 located between the quartz crystal oscillator 218 and the main flow of gas. The filter 354 may be of any suitable pore size. Pore sizes are in the 5-10 μm range are particularly suitable for this application. The filter 354 (or a similar filter) may be applied to the first embodiment described previously.

Alternatively, the filter 354 may be omitted if the quartz crystal oscillator 218 is located behind an aperture which is sufficiently small to prevent the ingress of dirt or other contaminants. For example, an aperture size of 0.25 mm would be suitable for use without a filter, provided that the full upstream pressure of the gas can be measured in this manner.

For example, either the first or second embodiments may further comprise an antenna (not shown) for remote communication with, for example, a base station. This will be discussed later. In this case, the antenna may be located outside the body 202 and connected to the sensor assembly 204 by means of a wire or equivalent connector.

The antenna itself may be adapted and arranged to use any suitable communication protocol; for example, a non-exhaustive list may be RFID, Bluetooth, Infra red (IR), 802.11 wireless, frequency modulation (FM) transmission or a cell network.

Alternatively, one-wire communication may be implemented. One-wire communication needs only a single metallic conductor to communicate: the 'return' path of the circuit is provided by capacitive coupling through the air between the communicating devices. The skilled person would be readily aware of alternatives of the antenna (and associated transmission hardware) which could be used with the embodiments discussed herein.

For example, communication may be effected by means of acoustic transmission from within the housing 208. A transmitter located within the housing 208 may effect acoustic transmission. The transmitter may comprise, for example, a simple fixed-frequency piezoelectric resonator.

A complementary receiver is also required and this component may be located remote from the meter assembly 200, 350 and may comprise hardware such as, for example, a phase-locked loop tone detector integrated with a microphone.

The sensor assembly 204 will now be described in more detail with reference to FIGS. 4 and 5. The quartz crystal oscillator 218 comprises a planar section of cut quartz. Quartz demonstrates piezoelectric behaviour, i.e. the application of a voltage across the crystal causes the crystal to change shape, generating a mechanical force. Conversely, a mechanical force applied to the crystal produces an electrical charge.

Two parallel surfaces of the quartz crystal oscillator 218 are metallised in order to provide electrical connections across the bulk crystal. When a voltage is applied across the crystal by means of the metal contacts, the crystal changes shape. By application of an alternating voltage to the crystal, the crystal can be caused to oscillate.

The physical size and thickness of the quartz crystal determines the characteristic or resonant frequency of the quartz crystal. Indeed, the characteristic or resonant frequency of the crystal 218 is inversely proportional to the physical thickness between the two metallised surfaces. Quartz crystal oscillators are well known in the art and so the structure of the quartz crystal oscillator 218 will not be described further here.

Additionally, the resonant vibration frequency of a quartz crystal will vary depending upon the environment in which the crystal is located. In a vacuum, the crystal will have a particular frequency. However, this frequency will change in different environments. For example, in a fluid, the vibration of the crystal will be damped by the surrounding molecules and this will affect the resonant frequency and the energy required to oscillate the crystal at a given amplitude.

Additionally, adsorption of gas or deposition of surrounding materials onto the crystal will affect the mass of the vibrating crystal, altering the resonant frequency. Such adsorption or deposition of material forms the basis for commonly used selective gas analysers in which an absorbing layer is formed on the crystal and increases in mass as gas is absorbed.

However, in the present case, no coating is applied to the quartz crystal oscillator 218. Indeed, deposition of material onto the quartz crystal oscillator 218 is undesirable in the present case since the accuracy of the measurement may be affected.

Figure 4:
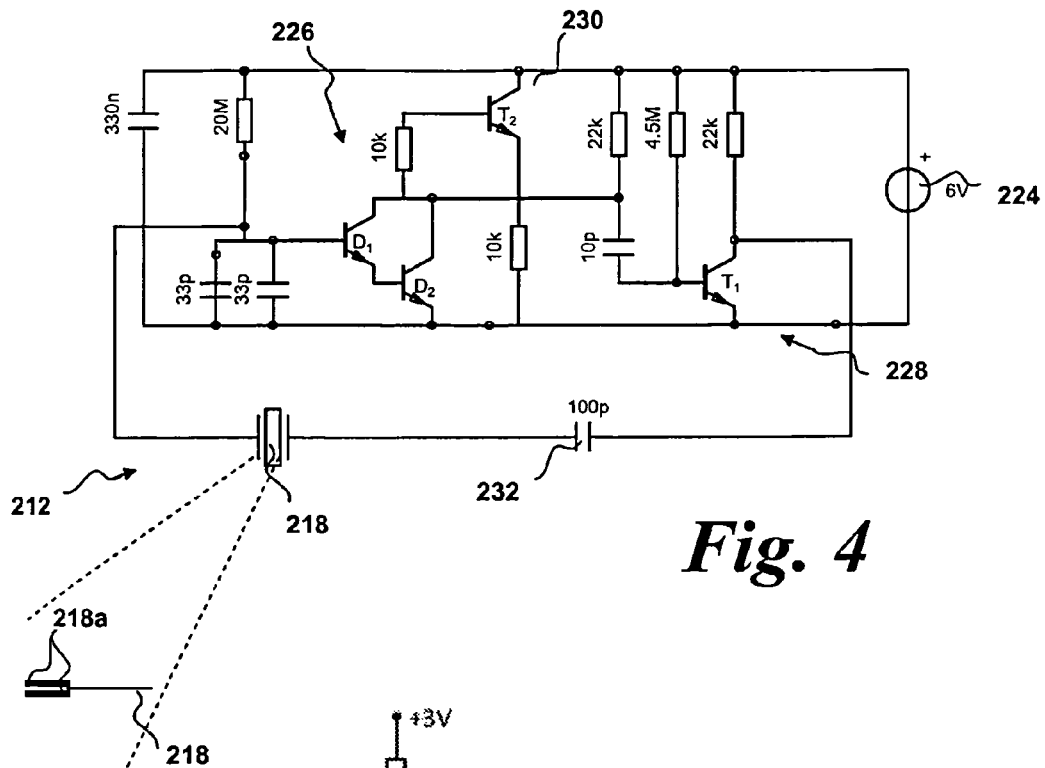
FIG. 4 is a schematic diagram of a drive circuit for use with either of the first or second embodiments.
Figure 5:
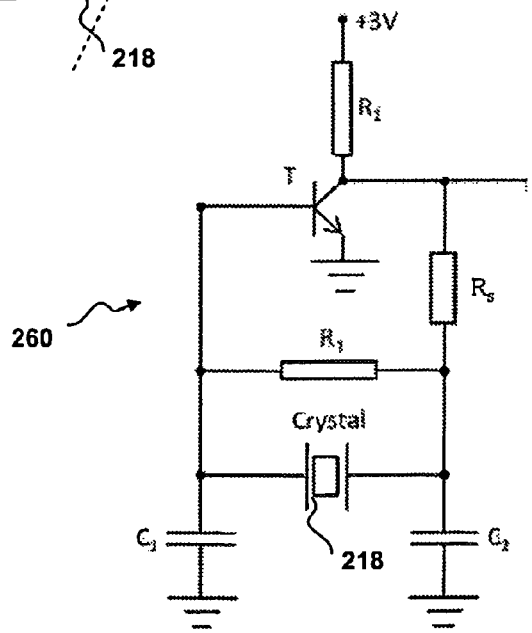
FIG. 5 is a schematic diagram showing an alternative the drive circuit for use with either of the first or second embodiments.

As shown in FIG. 4, the quartz crystal oscillator 218 of the present embodiment is tuning fork-shaped and comprises a pair of tines 218a approximately 5 mm long arranged to oscillate at a resonant frequency of 32.768 kHz. The tines 218a are formed in the planar section of quartz. The tines 218a of the fork oscillate normally in their fundamental mode, in which they move synchronously towards and away from each other at the resonant frequency.

Fused (or non-crystalline) quartz has a very low temperature-dependent coefficient of expansion and a low coefficient of elasticity. This reduces the dependence of the fundamental frequency on temperature and, as will be shown, temperature effects are minimal.

Additionally, it is desirable to use quartz which is AT cut or SC cut. In other words, the planar section of quartz is cut at particular angles, so that the temperature coefficient of the oscillation frequency can be arranged to be parabolic with a wide peak around room temperature. Therefore, the crystal oscillator can be arranged such that the slope at top of the peak is precisely zero.

Such quartz crystals are commonly available at relative low cost. In contrast to the majority of quartz crystal oscillators which are used in vacuo, in the present embodiment the quartz crystal oscillator 218 is exposed to the gas under pressure in the conduit 206.

The drive circuit 220 for driving the quartz crystal oscillator 218 is shown in FIG. 4. The drive circuit 220 must meet a number of specific criteria. Firstly, the quartz crystal oscillator 218 of the present invention may be exposed to a range of gas pressures; potentially, the pressures may vary from atmospheric pressure (when the gas cylinder 100 is empty) to around 900 bar g if the gas cylinder contains a pressurised gas such as hydrogen. Thus, the quartz crystal oscillator 218 is required to operate (and restart after a period of non-use) under a wide range of pressures.

Consequently, the quality (Q) factor of the quartz crystal oscillator 218 will vary considerably during use. The Q factor is a dimensionless parameter relating to the rate of damping of an oscillator or resonator. Equivalently, it may characterise the bandwidth of a resonator relative to its centre frequency.

In general, the higher the Q factor of an oscillator, the lower the rate of energy loss relative to the stored energy of the oscillator. In other words, the oscillations of a high Q factor oscillator reduce in amplitude more slowly in the absence of an external force. Sinusoidally driven resonators having higher Q factors resonate with greater amplitudes at the resonant frequency but have a smaller bandwidth of frequencies around that frequency for which they resonate.

The drive circuit 220 must be able to drive the quartz crystal oscillator 218 despite the changing Q factor. As the pressure in the gas cylinder 100 increases, the oscillation of the quartz crystal oscillator 218 will become increasingly damped, and the Q factor will fall. The falling Q factor requires a higher gain to be provided by an amplifier in the drive circuit 220. However, if too high an amplification is provided, the drive circuit 220, the response from the quartz crystal oscillator 218 may become difficult to distinguish. In this case, the drive circuit 220 may simply oscillate at an unrelated frequency, or at the frequency of a non-fundamental mode of the quartz crystal oscillator 218.

As a further limitation, the drive circuit 220 must be low power in order to run on small low power batteries for a long time with or without supplementary power such as photovoltaic cells.

The drive circuit 220 will now be described with reference to FIG. 4. In order to drive the quartz crystal oscillator 218, the drive circuit 220 essentially takes a voltage signal from the quartz crystal oscillator 218, amplifies it, and feeds that signal it back to the quartz crystal oscillator 218. The fundamental resonant frequency of the quartz crystal oscillator 218 is, in essence, a function of the rate of expansion and contraction of the quartz. This is determined in general by the cut and size of the crystal.

However, external factors also affect the resonant frequency. When the energy of the generated output frequencies matches the losses in the circuit, an oscillation can be sustained. The drive circuit 220 is arranged to detect and maintain this oscillation frequency. The frequency can then be measured by the microprocessor 240, used to calculate the appropriate property of the gas required by the user and, if required, output to a suitable display means (as will be described later).

The drive circuit 220 is powered by a 6 V battery 224. The battery 224, in this embodiment, comprises a lithium ion battery. However, alternative power sources will be readily apparent to the person skilled in the art; for example, other battery types both rechargeable and non-rechargeable and a solar cell arrangement.

The drive circuit 220 further comprises a Darlington pair Common Emitter amplifier 226. A Darlington pair comprises a compound structure consisting of two bipolar NPN transistors configured such that the current amplified by a first of the transistor is amplified further by the second one. This configuration enables a higher current gain to be obtained when compared to each transistor being taken separately. Alternative, PNP bipolar transistors may be used.

The Darlington pair 226 is arranged in a feedback configuration from a single transistor ($T_1$) Common Emitter amplifier 228. A NPN bipolar junction transistor is shown in FIG. 4. However, the skilled person would be aware of alternative transistor arrangements which may be used; for example, a bipolar junction PNP transistor or Metal Oxide Semiconductor Field Effect Transistors (MOSFETs).

The drive circuit 220 comprises a further NPN emitter follower transistor $T_2$ which acts as a buffer amplifier 230. The buffer amplifier 230 is arranged to function as a buffer between the circuit and the external environment. However, this feature is optional and may not required; for example, a FET could be directly connected to drive the circuit 220.

A capacitor 232 is located in series with the quartz crystal oscillator 218. The capacitor 232, in this example, has a value of 100 pF and enables the drive circuit 220 to drive the quartz crystal oscillator 218 in situations where the crystal has become contaminated, for example by salts or other deposited materials.

Additionally, the drive circuit 220 may be optimised for fast start of the quartz crystal oscillator 218. In order to achieve this, a further resistor and further capacitor may be connected between the base of transistor $D_1$ and ground. These components may comprise, for example, a 10 MΩ resistor and a 10 nF capacitor.

An alternative drive circuit 260 will now be described with reference to FIG. 5. The drive circuit shown in FIG. 5 is configured similarly to a Pierce oscillator. Pierce oscillators are known from digital IC clock oscillators. In essence, the drive circuit 260 comprises a single digital inverter (in the form of a transistor) T, three resistors $R_1$, $R_2$ and $R_S$, two capacitors $C_1$, $C_2$, and the quartz crystal oscillator 218.

In this arrangement, the quartz crystal oscillator 218 functions as a highly selective filter element. Resistor $R_1$ acts as a load resistor for the transistor T. Resistor $R_2$ acts as a feedback resistor, biasing the inverter T in its linear region of operation. This effectively enables the inverter T to operate as a high gain inverting amplifier. Another resistor $R_S$ is used between the output of the inverter T and the quartz crystal oscillator 218 to limit the gain and to dampen undesired oscillations in the circuit.

The quartz crystal oscillator 218, in combination with $C_1$ and $C_2$ forms a Pi network band-pass filter. This enables a 180 degree phase shift and a voltage gain from the output to input at approximately the resonant frequency of the quartz crystal oscillator 218. The above described drive circuit 260 is reliable and cheap to manufacture since it comprises relatively few components. This circuit is also particular applicable to low pressure applications.

As discussed above, the sensor assembly 204 may include a microprocessor 240 which receives inputs from the quartz crystal oscillator 218 and drive circuit 220. The microprocessor 240 may comprise and suitable arrangement, such as an ASIC or FPGA. The microprocessor 240 is programmed to calculate and, if required, display and communicate a determination of the mass flow rate of the gas through the orifice 212.

When used with the quartz crystal oscillator 218, the microprocessor 240 may be configured to measure the frequency for period of the signal from the drive circuit 220. This may be achieved by, for example, counting oscillations over a fixed time, and convert that frequency into a density value using an algorithm or look-up table. This value is passed to the microprocessor 240.

The microprocessor 240 also receives the measured temperature T from the temperature sensor 222. The microprocessor 240 is arranged to perform, based on the supplied inputs, a calculation to determine the mass flow rate of the gas through the orifice 212.

Once the mass flow rate has been determined, this data may be stored in a local memory, may be displayed on a display screen or may be transmitted to a remote station.

The microprocessor 240 may, optionally, be designed for mass production to be identical in all meter assembly 200, with different features in the software and hardware enabled for different gases.

Additionally, the microprocessor 240 may also be configured to minimise power consumption through implementation of standby or "sleep" modes which may cover the microprocessor 240 and additional components such as the drive circuit 220 and quartz crystal oscillator 218.

Various schemes may be implemented; for example, the microprocessor 240 may be on standby for 10 seconds out of every 11 seconds. Further, the microprocessor 240 may control the quartz crystal oscillator 218 and drive circuit 220 such that these components are put on standby for the majority of time, only being switching the more power-hungry components on for ½ second every 30 seconds.

Figure 6:
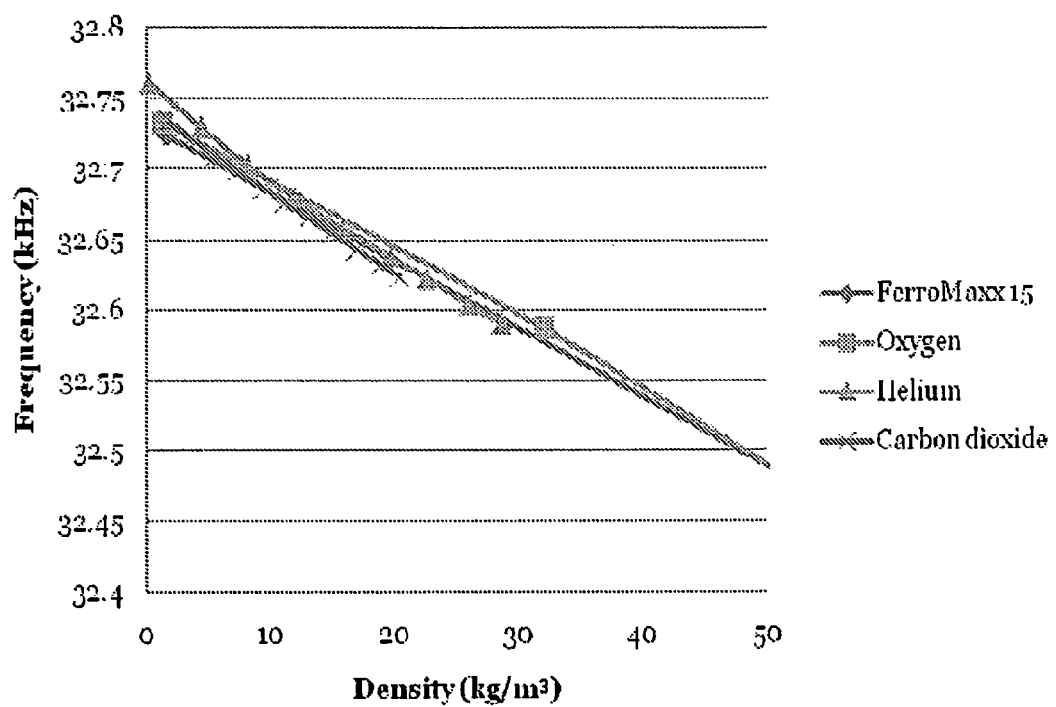
FIG. 6 shows a graph of quartz crystal frequency (kHz) on the Y-axis as a function of density (kg/m$^3$) for a number of different gases.

The theory and operation of the sensor assembly 204 will now be described with reference to FIGS. 6 and 7.

The quartz crystal oscillator 218 has a resonant frequency which is dependent upon the density of the fluid in which it is located. Exposing an oscillating tuning fork-type planar crystal oscillator to a gas leads to a shift and damping of the resonant frequency of the crystal (when compared to the resonant frequency of the crystal in a vacuum). There are a number of reasons for this. Whilst there is a damping effect of the gas on the oscillations of the crystal, the gas adjacent the vibrating tines 218a of the tuning fork crystal oscillator 218 increases the effective mass of the oscillator. This leads to a reduction in the resonant frequency of the quartz crystal oscillator according to the motion of a one-sided, fixed elastic beam:

$$\frac{\Delta\omega}{\omega_0} = \frac{\rho t}{2\rho_q w}\left(c_1 + c_2\frac{\partial}{t}\right) \quad 1)$$

Where $$\frac{\Delta\omega}{\omega_0}$$

is the relative change in resonant angular frequency, $\rho$ is the gas density, t is the thickness of the quartz oscillator, $\rho_q$ is the density of the quartz oscillator and w is the width of the fork. $c_1$ and $c_2$ are geometrically dependent constants and $\partial$ is the thickness of the surface layer of gas as defined by:

$$\partial = \sqrt{\frac{2\eta}{\rho\omega_0}} \quad 2)$$

Where $\eta$ is the temperature dependent viscosity of the gas.

The two parts of equation 1) relate to a) the additive mass of the gas on the tines of the quartz crystal oscillator 218 and to b) the shear forces arising on the outermost surface layer of the tines during oscillation.

The equation can thus be rewritten in terms of frequency and simplified to:

$$\Delta f = A\rho + \beta\sqrt{\rho} + C \quad 3)$$

Where $$A = \frac{c_1 t}{2\rho_q w}f_0, B = \frac{c_2}{2\rho_q w}\sqrt{\frac{\eta}{\pi}}\sqrt{f_0}$$

and C is an offset constant and $f_0$ is the natural resonant frequency of the crystal in a vacuum.

It has been found by the inventors that a suitably good approximation can be obtained by approximating:

$$\Delta f \approx A\rho \quad 4)$$

Consequently, to a good approximation, the change in frequency is proportional to the change in density of the gas to which the quartz crystal oscillator is exposed. FIG. 6 shows, for a number of different gases/gas mixtures, that the resonant frequency of the quartz crystal oscillator 218 varies linearly as a function of density.

In general, the sensitivity of the quartz crystal oscillator 218 is that a 5% change in frequency is seen with, for example, Oxygen gas (having a molecular weight of 32 AMU) at 250 bar when compared to atmospheric pressure. Such pressures and gas densities is typical of the storage cylinders used for permanent gases, which are normally between 137 and 450 bar g for most gases, and up to 700 or 900 bar g for helium and hydrogen.

The quartz crystal oscillator 218 is particularly suitable for use as a density sensor forming part of a mass flow meter for commercially-supplied gases. In order to sense correctly the density of a gas, it is necessary for the gas to be free from dust and droplets of liquids, which is guaranteed with commercially supplied gases, but not with air or in the generality of pressure monitoring situations.

Once the density value is obtained from the quartz crystal oscillator 218, the mass flow rate of gas through the orifice 212 can be determined. The mass flow rate, Q, through an orifice is defined as:

$$Q = kv\rho A \quad 5)$$

Where k is a constant, v is the velocity of the gas, $\rho$ is the upstream density of the gas and A is the cross-sectional area of the orifice A. However, from Bernoulli's equation 6):

$$P_1 + \frac{1}{2}\rho_1 v_1^2 = P_2 + \frac{1}{2}\rho_2 v_2^2 \qquad 6)$$

As the cross sectional area of an orifice decreases, the speed of the gas will increase and the pressure of the gas will be reduced.

The determination of mass flow rate through the orifice 212 depends on a condition known as "choked" or "critical" flow. Such a situation arises when the gas velocity reaches sonic conditions, i.e. when the flow restriction caused by the orifice plate 210 is such that the velocity of gas flowing through the orifice 212 reaches the speed of sound. This occurs when the upstream pressure $P_1$ is at least 0.5 bar higher than the downstream pressure $P_2$.

Once this condition is met, there is very little further increase in the velocity of air through the orifice 212. Therefore, at the choked flow condition where v=c (the speed of sound in the gas in question), equation 5) becomes:

$$Q = kc\rho A \qquad 7)$$

Consequently, for an orifice having a fixed cross sectional area A, the mass flow through the orifice 212 is dependent only upon the upstream density. This is the parameter which the quartz crystal oscillator 218 is arranged to measure.

In addition, the speed of sound c is proportional to the square root of the absolute temperature, $\sqrt{T}$. However, as previously described, the temperature sensor 222 does not need to be particularly accurate. For example, if the error in temperature is 0.5K at 300K, this translates to only a 1:1200 error in the calculated speed of sound. Therefore, for many applications, the temperature sensor 222 is not needed and could be eliminated.

Figure 7:
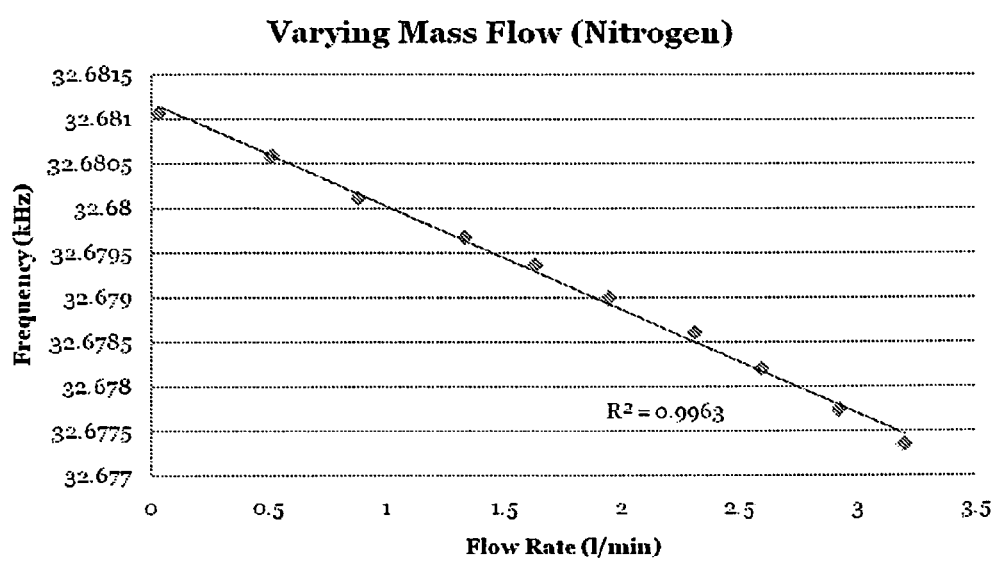
FIG. 7 shows a graph of quartz crystal frequency (kHz) on the Y-axis as a function of mass flow rate (in liters/min) through an orifice.

FIG. 7 illustrates experimental data of mass flow rate measurement. FIG. 7 is a graph of resonant frequency (in kHz) on the Y-axis as a function of gas flow rate (in liters/minute) on the X-axis for Nitrogen gas. As shown, the graph is highly linear and shows that mass flow rate can be measured accurately using the quartz crystal oscillator 218.

Further, the high accuracy of the quartz crystal oscillator 218 enables measurement to a very high accuracy with a resolution of parts per million. Coupled with the linear response of the quartz density sensor 218 at high densities and pressures, the high accuracy enables the mass flow rate of very light gases such as $H_2$ and He to be measured accurately.

Figure 8:
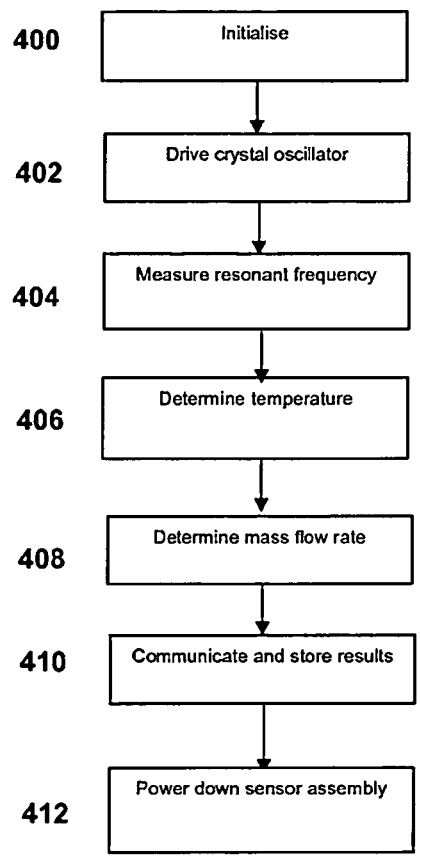
FIG. 8 is a flow chart illustrating a method according to a described embodiment.

A method according to an embodiment of the present invention will now be described with reference to FIG. 8. The method described below is applicable to each of the first and second embodiments described above.

Step 400: Initialise Measurement

At step 400, the measurement of the mass flow rate of gas through the orifice 212 is initialised. This may be activated by, for example, a user pressing a button on the outside of the housing 208. Alternatively, the measurement may be initiated by means of a remote connection, for example, a signal transmitted across a wireless network and received by the meter assembly 200, 350 through an antenna.

As a further alternative or addition, the meter assembly 200, 350 may be configured to initialise remotely or on a timer. The method proceeds to step 402.

Step 402: Drive the Quartz Crystal Oscillator

Once initialised, the drive circuit 220 is used to drive the quartz crystal oscillator 218. During initialisation, the drive circuit 220 applies a random noise AC voltage across the crystal 210. At least a portion of that random voltage will be at a suitable frequency to cause the crystal 210 to oscillate. The crystal 210 will then begin to oscillate in synchrony with that signal.

As will be appreciated, the quartz crystal oscillator 218 is, in essence, a self-contained detector and driver since the resonant frequency of the crystal itself is being measured.

By means of the piezoelectric effect, the motion of the quartz crystal oscillator 218 will then generate a voltage in the resonant frequency band of the quartz crystal oscillator 218. The drive circuit 220 then amplifies the signal generated by the quartz crystal oscillator 218, such that the signals generated in the frequency band of the quartz crystal resonator 202 dominate the output of the drive circuit 220. The narrow resonance band of the quartz crystal filters out all the unwanted frequencies and the drive circuit 220 then drives the quartz crystal oscillator 218 at the fundamental resonant frequency f. Once the quartz crystal oscillator 218 has stabilised at a particular resonant frequency, the method proceeds to step 404.

Step 404: Measure Resonant Frequency of Quartz Crystal Oscillator

The resonant frequency f is dependent upon the environmental conditions within the upstream portion 214 of the conduit 206. In the present embodiment, the change in resonant frequency $\Delta f$ is, to a good approximation, proportional in magnitude to the change in density of the gas in upstream portion 214 of the conduit 206 and will decrease with increasing density.

In order to make a measurement, the frequency of the quartz crystal oscillator 218 is measured for a period of approximately 1 s. This is to enable the reading to stabilise and for sufficient oscillations to be counted in order to determine an accurate measurement. The measurement of frequency is carried out in the microprocessor 240. The microprocessor 240 may also log the time, $T_1$, when the measurement was started.

Once the frequency has been measured, the method proceeds to step 406.

Step 406: Measure Temperature of Gas

At step 406, the temperature sensor 222 measures the temperature of the gas within the upstream portion 214 of the conduit 206. This measurement is required in order to accurately determine the speed of sound in the gas flow.

As previously described, the temperature measurement does not need to be particularly accurate. For example, if the temperature sensor 222 is accurate to 0.5° C., then this corresponds to an error of only approximately one part in twelve hundred on the absolute temperature value required for the calculation of the speed of sound.

As an alternative, this step may simply involve a fixed temperature value being inputted to the microprocessor 240. This may occur, for example, in situations where a known temperature environment is used, or where a high degree of accuracy is not required. In this case, the temperature sensor 222 is not required.

Step 408: Determine the Mass Flow of Gas

This is done using equation 7) above where the density ρ of the gas upstream of the orifice 212 and, optionally, the temperature T of the gas is known. Therefore, knowing the resonant frequency as measured in step 404, the (optional) known temperature T of the gas measured in step 406, an accurate measurement of the mass flow rate through the orifice 212 can be made. The method then proceeds to step 410.

Step 410: Communicate and Store Results

The mass flow rate of the gas can be displayed in a number of ways. For example, a screen (not shown) attached to the housing 208, body 202 or regulator 150, 300 could display the mass flow rate of the gas through the orifice 212 (and as a consequence, the mass flow rate of gas exiting the coupling 160). In the alternative, the mass flow rate measurement could be communicated remotely to a base station or to a meter located on an adjacent fitting as will be described later.

As a yet further alternative, the mass flow rate of gas at time $T_1$ could be stored in a memory local to said microprocessor 240 to generate a time log.

The method then proceeds to step 412.

Step 412: Power Down Sensor Assembly

It is not necessary to keep the meter assembly 200, 350 operational at all times. To the contrary, it is beneficial to reduce power consumption by switching the meter assembly 200, 350 off when not in use. This prolongs the life of the battery 224.

The configuration of the drive circuit 220 enables the quartz crystal oscillator 218 to be restarted irrespective of the pressure in the upstream portion 214 of the conduit 206. Therefore, the meter assembly 200, 350 can be shut down as and when required in order to save battery power.

Variations of the above embodiments will be apparent to the skilled person. The precise configuration of hardware and software components may differ and still fall within the scope of the present invention. The skilled person would be readily aware of alternative configurations which could be used.

Figure 9:
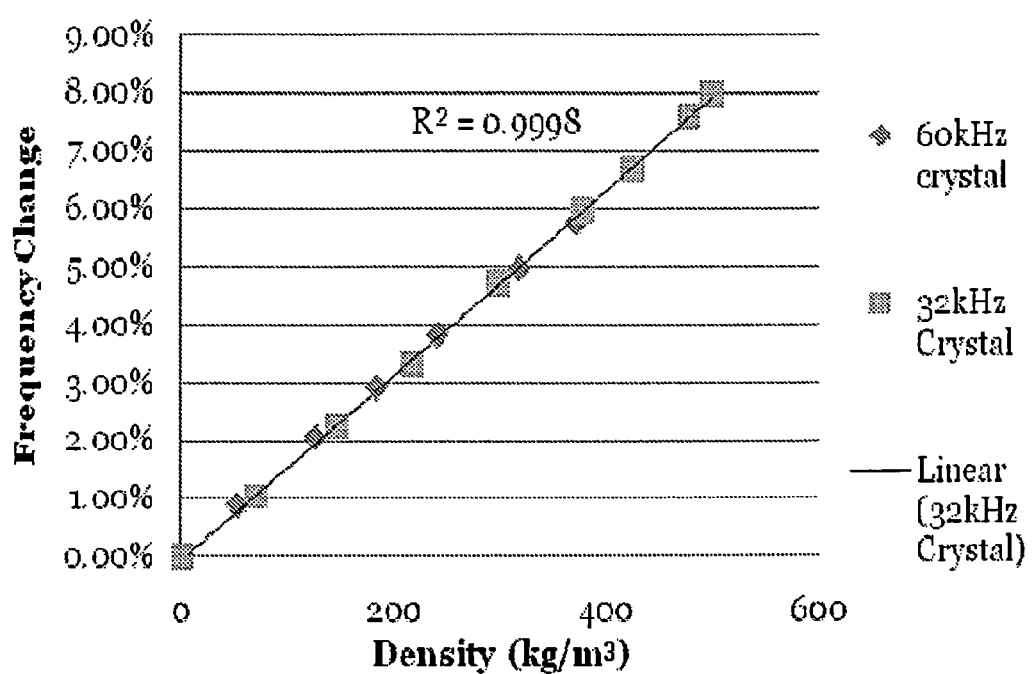
FIG. 9 shows a graph of the frequency behaviour of different crystal types.

For example, the above described embodiments have utilised a quartz crystal oscillator having a fundamental frequency of 32.768 kHz. However, crystals operating at alternative frequencies may be used. For example, quartz crystal oscillators operating at 60 kHz and 100 kHz may be used with the embodiments described above. A graph showing the frequency change with density for different crystals is shown in FIG. 9. As a further example, a crystal oscillator operating at a frequency of 1.8 MHz could be used.

Higher frequency operation enables the pressure to be monitored more frequently because a shorter time period is required to sample a given number of cycles. Additionally, higher frequency crystals enable a smaller duty cycle to be used in a "sleep" mode of a crystal. By way of explanation, in most cases, the crystal and drive circuit will spend most of the time switched off, only being switched on for a second or so when a measurement is needed. This may occur, for example, once a minute. When a higher frequency crystal is used, the pressure can be measured faster. Therefore, the time in which the crystal is operational can be reduced. This may reduce power consumption and concomitantly improve battery life.

Additionally, the above embodiments have been described by measuring the absolute frequency of a quartz crystal oscillator. However, in self-contained electronics incorporated in a gas cylinder associated regulator, it may advantageous to measure the shift in frequency of the sensor by comparing that frequency with a reference crystal of identical type but enclosed in a vacuum or pressure package. The pressure package may contain gas at a selected density, gas under atmospheric conditions or may be open to the atmosphere external of the gas cylinder.

Figure 10:
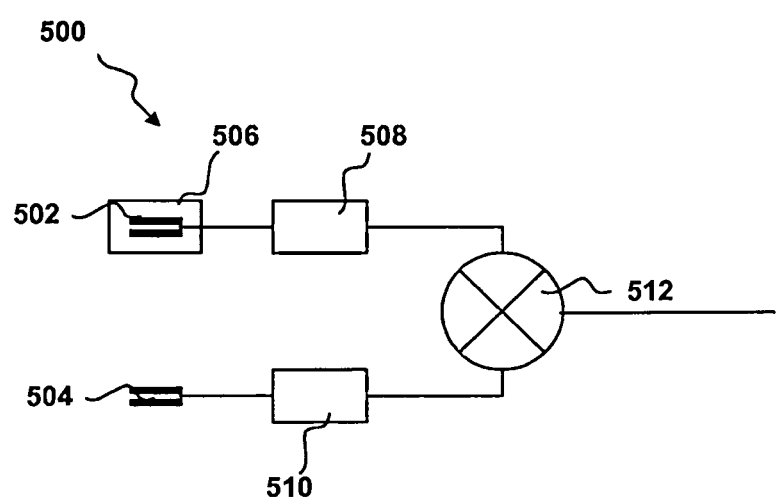
FIG. 10 is a schematic diagram showing an alternative sensor assembly comprising two quartz crystals.

A suitable sensor assembly 500 is shown in FIG. 10. The sensor assembly 500 comprises a first quartz crystal oscillator 502 and a second quartz crystal oscillator 504. The first quartz crystal oscillator 402 is a reference crystal which is located within a sealed container 506 under vacuum. The first quartz crystal oscillator 502 is driven by a drive circuit 508.

The second quartz crystal oscillator 504 is a crystal similar to the crystal 218 described in the earlier embodiments. The second quartz crystal oscillator 504 is exposed to the gas environment within the housing 208. The second quartz crystal oscillator 504 is driven by a drive circuit 510.

This comparison may be performed using an electronic mixer circuit 512 which combines the two frequency signals and produces an output at a frequency equal to the difference between the two crystals. This arrangement enables small changes due to, for example, temperature to be negated.

Further, the circuitry used in the sensor assembly 204 can be simplified because only the difference frequency is required to be measured. Further, this approach is particularly suitable for use with a high frequency (MHz) crystal oscillator, where it may be difficult to measure the crystal frequency directly.

Additionally, all of the electronics required to measure and display the density, mass or mass flow need not be mounted on or in the gas cylinder. For example, electronic functions could be split between units mounted on the cylinder permanently and units mounted on either a customer's usage station or temporarily mounted on the outlet of the cylinder such as the position normally used for a conventional flow meter.

Figure 11:
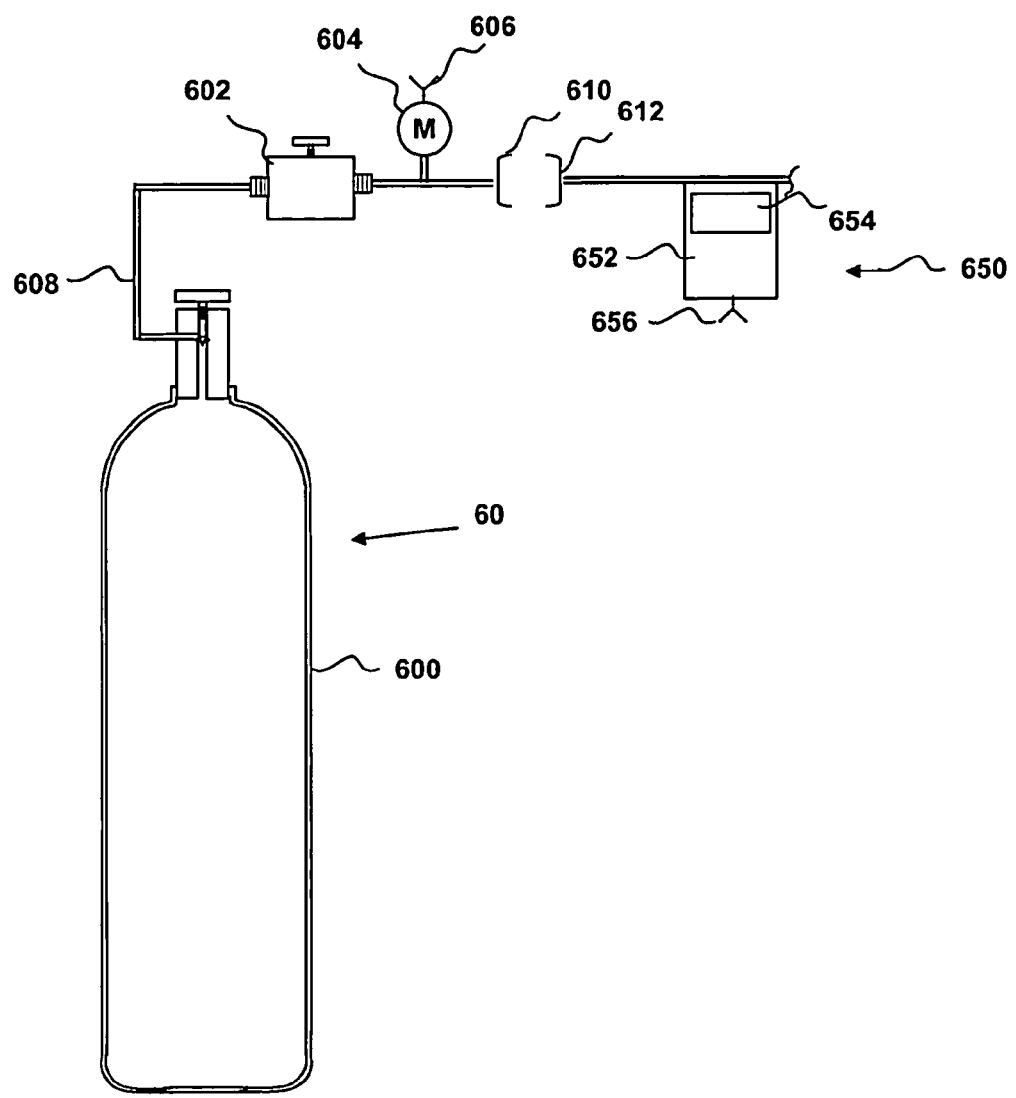
FIG. 11 shows an alternative arrangement using a remote electronic data unit.

An example of this arrangement is shown with reference to FIG. 11. The arrangement comprises a gas cylinder assembly 60 comprising a gas cylinder 600, a regulator 602 and a mass flow rate meter 604. The gas cylinder 600, regulator 602 and mass flow rate meter 604 are substantially similar to the gas cylinder 100, regulator 150 and meter assembly 200, 350 substantially as previously described with reference to previous embodiments.

In this embodiment, the mass flow rate meter 604 comprises a quartz crystal oscillator and drive circuit (not shown) similar to the quartz crystal oscillator 218 and drive circuit 220 of earlier embodiments. An antenna 606 is provided for communication via any suitable remote communication protocol; for example, Bluetooth, Infra-red (IR) or RFID. Alternatively, one-wire communication may be utilised.

As a further alternative, acoustic communication methods may be used. The advantage of such methods is that remote communication can be effected without the requirement for an external antenna.

A connection pipe 608 is connected to the outlet of the gas cylinder 600. The connection pipe is terminated by a quick connect connection 610. The quick connect connection 610 enables connecting pipe work or components to be connected and disconnected easily and quickly from the gas cylinder 600.

A quick connect unit 650 is provided for connection to the gas cylinder 600. A complementary quick connect connector 612 is provided for connection to the connector 608. Further, the quick connect unit 650 is provided with a data unit 652. The data unit 552 comprises a display 554 and an antenna 556 for communication with the antenna 604 of the gas cylinder assembly 60. The display 554 may comprise, for example, an LCD, LED or daylight-readable display to minimise power consumption and maximise visibility of the display.

The data unit 652 may log various parameters as measured by the sensor assembly 602 of the gas cylinder assembly 60. For example, the data unit 652 could log mass flow rate versus time. Such a log could be useful, for example, to welding contractors wishing to check that gas flow was present and correct during lengthy gas welding procedures on critical components, or to supply a company data on a particular customer's usage.

Alternatively, data from the data unit 650 can be output to a computer-enabled welding machine (for welding applications) or other gas-using equipment, to allow the calculation of derived parameters, along with warning messages.

Additionally, the data unit 650 may be arranged to provide the following functions: to provide an audible or visible alarm if the gas type changes; to contain and display data on use of gas; to provide multimode operation, e.g. a supplier/filler mode and a customer mode; to allow input of data; to provide data such as a cylinder number, the type of gas, a certificate of analysis, a customer history (who had the cylinder over what dates), safety data and operational tips can be carried in summary form on the cylinder.

As an alternative, all of the above examples may, optionally, be processed, stored or obtained from a system located entirely on (or within) the gas cylinder 600 or housing 208 as discussed in terms of the meter assembly 200, 350.

Whilst the above embodiments have been described with reference to the use of a quartz crystal oscillator, the skilled person would be readily aware of alternative piezoelectric materials which could also be used. For example, a non-exhaustive list may include crystal oscillators comprising: lithium tantalate, lithium niobate, lithium borate, berlinite, gallium arsenide, lithium tetraborate, aluminium phosphate, bismuth germanium oxide, polycrystalline zirconium titanate ceramics, high-alumina ceramics, silicon-zinc oxide composite, or dipotassium tartrate.

Embodiments of the present invention have been described with particular reference to the examples illustrated. While specific examples are shown in the drawings and are herein described in detail, it should be understood, however, that the drawings and detailed description are not intended to limit the invention to the particular form disclosed. It will be appreciated that variations and modifications may be made to the examples described within the scope of the present invention.

The invention claimed is:

1. A method of measuring the mass flow rate of a gas through a conduit comprising an orifice through which choked flow is occurring, the orifice dividing the conduit into an upstream portion upstream of said orifice and a downstream portion downstream of said orifice, the orifice having a cross-sectional area, the method comprising:
   a) driving a piezoelectric crystal oscillator in contact with the gas upstream of the orifice such that the piezoelectric crystal oscillator resonates at a resonant frequency, the piezoelectric crystal oscillator having at least two planar tines;
   b) measuring the resonant frequency of the piezoelectric crystal oscillator and determining the density of the gas upstream of the orifice based on the measured resonant frequency; and
   c) determining the mass flow rate of gas through the conduit based on the determined density of the gas upstream of the orifice, the cross-sectional area of the orifice, and the speed of sound in the gas.

2. A method of according to claim 1, wherein the pressure upstream of said orifice is at least 0.5 bar higher than the pressure downstream of said orifice.

3. A method according to claim 1, wherein the method further comprises determining the temperature of the gas upstream of the orifice and determining the speed of sound in the gas based on the determined temperature.

4. A method according to claim 1, wherein said piezoelectric crystal oscillator comprises a quartz crystal oscillator.

5. A method according to claim 1, wherein said piezoelectric crystal oscillator has a resonant frequency of 32 kHz or greater.

6. A method according to claim 1, wherein the gas is dispensed from a pressure regulator or valve located upstream of the piezoelectric crystal oscillator.

7. A method according to claim 6, wherein the pressure regulator or valve is electronically controlled in response to the measured mass flow rate of gas through said orifice.

8. A computer program product executable by a programmable processing apparatus, comprising one or more software portions for performing the steps of claim 1.

9. A computer usable storage medium having a computer program product according to claim 8 stored thereon.

10. A meter for measuring the mass flow rate of a gas through a conduit, comprising:
   a flow restriction orifice dividing the conduit into an upstream portion upstream of said orifice and a downstream portion downstream of said orifice, the orifice having a cross-sectional area, wherein in use choked flow of the gas occurs through the orifice;
   a sensor assembly including a piezoelectric crystal oscillator comprising at least two planar tines in said upstream portion such that said piezoelectric crystal oscillator is in contact with said gas when the meter is in use, said sensor assembly being arranged:
      to drive the piezoelectric crystal oscillator such that the piezoelectric crystal oscillator resonates at a resonant frequency;
      to measure said resonant frequency of said piezoelectric crystal oscillator and to determine the density of the gas upstream of the orifice based on the measured resonant frequency; and
      to determine the mass flow rate through the conduit based on the determined density of the gas upstream of the orifice, the cross-sectional area of the orifice, and the speed of sound in the gas.

11. A meter according to claim 10, wherein the meter further comprises a drive circuit comprising a Darlington pair arranged in a feedback configuration from a common emitter amplifier.

12. A meter according to claim 10, further comprising a temperature sensor arranged to determine the temperature of gas adjacent said piezoelectric crystal oscillator; wherein the sensor assembly is further arranged to determine the speed of sound in the gas based on the determined temperature.

13. A meter according to claim 10, wherein said piezoelectric crystal oscillator comprises a quartz crystal oscillator.

14. A meter according to claim 10, wherein said piezoelectric crystal oscillator has a resonant frequency of 32 kHz or greater.

15. A meter according to claim 10, wherein the meter is arranged downstream of a pressure regulator or valve.

16. A meter according to claim 15, wherein the meter is arranged to control electronically the pressure regulator or valve in response to be measured mass flow rate through the flow restriction orifice.

* * * * *